March 16, 1937.  W. G. MITCHELL  2,073,704
DRILL PRESS
Filed July 13, 1935
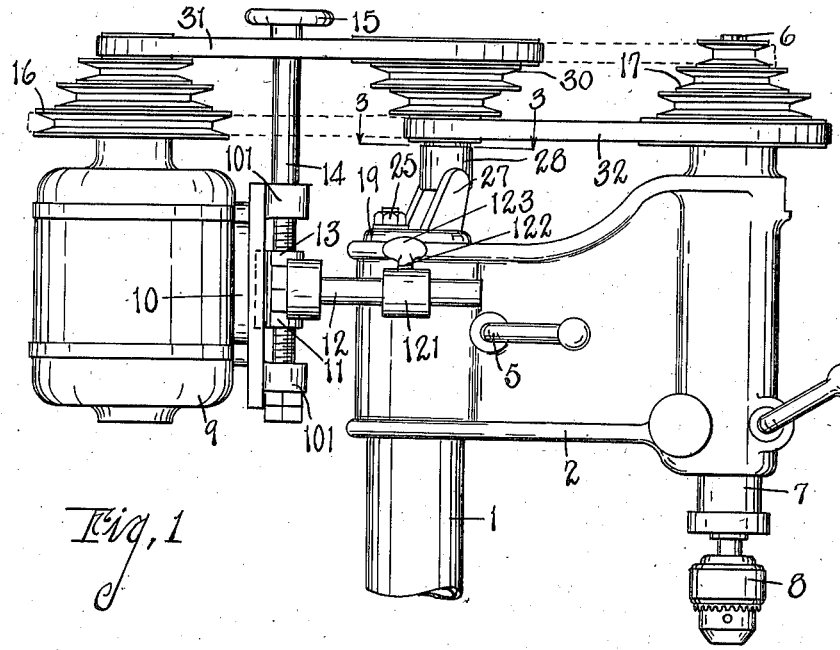
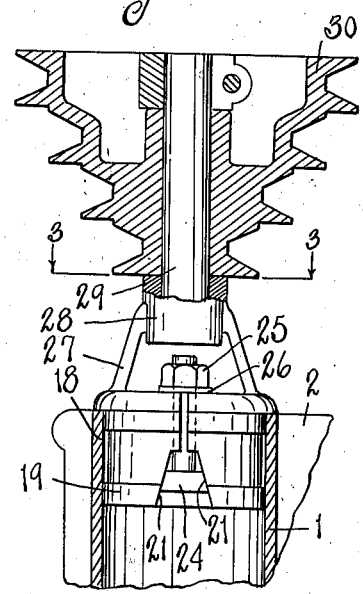
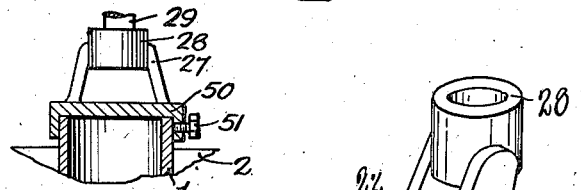
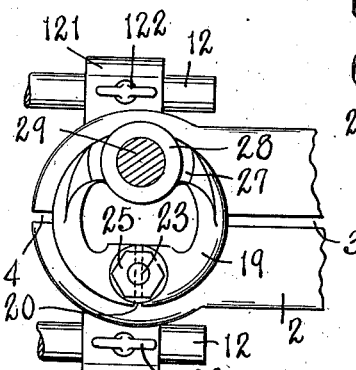
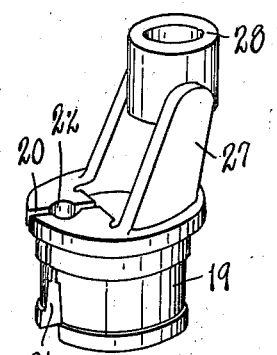
INVENTOR.
Walter G. Mitchell
BY
ATTORNEY.

Patented Mar. 16, 1937

2,073,704

UNITED STATES PATENT OFFICE 2,073,704

DRILL PRESS

Walter G. Mitchell, Oak Park, Ill.

Application July 13, 1935, Serial No. 31,138

4 Claims. (Cl. 74—217)

This invention relates to drill presses and particularly to drill presses of the type run by belt drive from individual motors so that the drills are driven at comparatively high speeds.

The objects of the invention are:

First, to produce a drill press having a change speed mechanism that is suitable for use primarily in reducing the speed at which the spindle of the press is driven to permit the use of larger size drills at speeds which will reduce or eliminate the excessive heating which draws the temper of the drill and reduces its usefulness.

Second, to produce such a change speed mechanism that may be made inexpensively and may be easily installed upon drill presses of the type set forth above.

Third, to produce such a change speed device that is in the nature of an attachment.

Further objects and advantages pertaining to details and economies of construction and operation will appear from the description to follow.

A preferred embodiment of the invention is illustrated in the accompanying drawing, in which:

Fig. 1 is a view in elevation of the side of the upper portion of a drill press embodying my invention.

Fig. 2 is a sectional view through the intermediate pulley of my change speed mechanism.

Fig. 3 is a sectional plan view taken on lines 3—3 of Figs. 1 and 2.

Fig. 4 is a perspective view of an expansion plug used in my improved apparatus.

Fig. 5 is a detail sectional view of a slightly modified form of my device.

In the drawing, 1 represents the column of a drill press, and 2 the head which is split as indicated at 3 and 4 to clamp the column 1. 5 is a bolt for clamping the split head in position on the column. 6 is the spindle, 7 the quill and 8 the chuck.

9 is the driving motor supported on the support 10 which consists of a supporting member 11 having parallel rods 12 extending therefrom and provided with a threaded portion 13 engaging a screw 14 having a hand wheel 15 thereon. Bearing members 101 also engage the screw, so that by turning the hand wheel 15 the motor 9 may be raised or lowered to desired position.

The rods 12 extend through sockets 121 on the sides of the head and are held in place by set screws 122 provided with thumb grasps 123. By loosening the set screws 122, the motor may be pushed toward or away from the column, as will be obvious, and may be fixed in position by tightening the screws 122.

The motor is provided with a multi-step pulley 16 of the V-belt type having its axis arranged vertically. The spindle 6 is provided with a similar multi-step pulley 17 arranged on a vertical axis. The pulley 16 is a driving pulley and the pulley 17 is a driven pulley in the arrangement according to my invention.

The column 1 as shown is tubular in form so that the top portion has a hollow cylindrical portion 18. 19 is an expansion plug adapted to fit and rotate in the hollow portion 18 of the top of the column 1. It will be appreciated that instead of having a hollow column in which a plug is fitted, a cap 50 may be employed fitting over the top of the column and held by a set screw 51, as shown in Fig. 5. On this may be mounted the multi-step pulley hereinafter described and which may be arranged to be clamped to the top of the column as will be readily understood.

The expansion plug 19 is split at 20 and the lower portion of the slot at 20 is made with the sides diverging downwardly as at 21. A bore 22 meets the diverging portion 21 and a bolt 23 passing through the bore has its head 24 engaging the diverging sides 21 and is provided with a nut 25 and washer 26, so that a tightening of the nut 25 forces the head 24 between the diverging walls to expand the plug and clamp it firmly in desired position in the hollow portion 18 at the top of the column 1.

Arms 27 extend upwardly from the plug 19 and support eccentrically of the axis of rotation of the plug 19 a bearing 28 which is arranged to receive a vertical shaft 29 on which a multi-step pulley 30 is keyed or otherwise fastened.

It will be noted that in the particular embodiment of my invention shown the multi-stage pulleys 16 and 17 are of the conical type having the smallest pulley at the top, whereas the pulley 30 is of the same type having the smaller pulley at the bottom. It will be understood that the pulley 17 is splined to the spindle 6 to permit the spindle to be moved through the pulley 17 in feeding the drill.

A belt 31 extends from the driving pulley 16 to the pulley 30 and a belt 32 extends from the intermediate pulley 30 to the driven pulley 17, so that in the arrangement shown in full lines in Fig. 1 the spindle is driven at a slow speed. With the belts arranged as is shown by the dotted lines in Fig. 1, of course, the speed of the spindle would be greatly increased.

If it is desired to change the belts to different stages of the pulleys 16, 17, and 30, this is accomplished by loosening the set screws 122 to move the motor toward the column. This loosens the belt 31 and permits its removal if desired. The nut 25 may then be loosened and by rotating the plug 19 about its vertical axis the pulley 30 is swung toward or away from the pulley 17. In loosening the belt 32 as shown in Fig. 1, the pulley 30 would be swung toward the pulley 17 as will be appreciated. The belts can be then rearranged and the plug 19 rotated to swing the pulley 30 away from the pulley 17 to tighten the belt. The nut 25 is then tightened to expand the plug 19 and fix it in desired position. Of course, if a cap is used instead of a plug, it may be contracted to clamp the top of the column or provided with other means for holding it rigidly in position at the desired adjustment. The motor 9 is then moved away from the column 1 and is fixed in its desired position by means of the set screws 122.

In the particular arrangement shown, the plug 19 can be supplied with the pulley 30 thereon as an attachment for standard drill presses having columns with hollow tops and the particular arrangement of driving motor and spindle, the addition of belts 31 and 32 making a complete conversion of a high speed drill press to a lower speed drill press. It is also possible, as has been pointed out, to have a hollow cap provided with the pulley 30 to serve as an attachment to fit over the top of the columns of standard drill presses.

I have shown a preferred embodiment of my invention and wish to claim the same specifically and also broadly as pointed out in the appended claims.

Having thus described my invention, what I claim as new and desire to secure by Letters Patent is:

1. In a drill press, the combination of a vertical column with a hollow upper end, a drill head on said column and having a drill spindle with a driven multi-step pulley therefor disposed on a vertical axis, a driving motor having thereon a multi-step driving pulley disposed on a vertical axis, a support for said driving motor and driving pulley, means for adjustably moving said support to or away from said column, an expansion plug fitted in and rotatable about a vertical axis in the hollow end of said column, means for expanding said expansion plug to fix it in desired position, an intermediate multi-step pulley disposed on a vertical axis eccentric to the axis of rotation of said plug, whereby rotation of said plug will vary the distance between the axis of said intermediate pulley and the axis of said driven pulley, a belt connecting said intermediate pulley with said driving pulley, and a second belt connecting said intermediate pulley with said driven pulley.

2. In a drill press, the combination of a vertical column with a hollow upper end, a drill head on said column and having a drill spindle with a driven pulley therefor disposed on a vertical axis, a driving motor having thereon a driving pulley disposed on a vertical axis, a support for said driving motor and driving pulley, means for adjustably moving said support to or away from said column, an expansion plug fitted in and rotatable about a vertical axis in the hollow end of said column, means for expanding said expansion plug to fix it in desired position, an intermediate multi-step pulley disposed on a vertical axis eccentric to the axis of rotation of said plug, whereby rotation of said plug will vary the distance between the axis of said intermediate pulley and the axis of said driven pulley, a belt connecting said intermediate pulley with said driving pulley, and a second belt connecting said intermediate pulley with said driven pulley.

3. In a drill press, the combination of a vertical column with a hollow upper end, a drill head on said column and having a drill spindle with a driven multi-step pulley therefor disposed on a vertical axis, a driving motor having thereon a multi-step driving pulley disposed on a vertical axis, an expansion plug fitted in and rotatable about a vertical axis in the hollow end of said column, means for expanding said expansion plug to fix it in desired position, an intermediate multi-step pulley disposed on a vertical axis eccentric to the axis of rotation of said plug, whereby rotation of said plug will vary the distance between the axis of said intermediate pulley and the axis of said driven pulley, a belt connecting said intermediate pulley with said driving pulley, and a second belt connecting said intermediate pulley with said driven pulley.

4. In a drill press, the combination of a vertical column with a hollow upper end, a drill head on said column and having a drill spindle with a driven pulley therefor disposed on a vertical axis, a driving motor having thereon a driving pulley disposed on a vertical axis, an expansion plug fitted in and rotatable about a vertical axis in the hollow end of said column, means for expanding said expansion plug to fix it in desired position, an intermediate multi-step pulley disposed on a vertical axis eccentric to the axis of rotation of said plug, whereby rotation of said plug will vary the distance between the axis of said intermediate pulley and the axis of said driven pulley, a belt connecting said intermediate pulley with said driving pulley, and a second belt connecting said intermediate pulley with said driven pulley.

WALTER G. MITCHELL.